(12) United States Patent
Qi

(10) Patent No.: US 6,884,885 B2
(45) Date of Patent: Apr. 26, 2005

(54) PRODUCTION OF CYCLODEXTRIN COMPLEXES

(75) Inventor: Helena Qi, Munster, IN (US)

(73) Assignee: Cerestar Holding B.V. (NL)

( * ) Notice: Subject to any disclaimer, the term of this patent is extended or adjusted under 35 U.S.C. 154(b) by 15 days.

(21) Appl. No.: 10/024,541

(22) Filed: Dec. 17, 2001

(65) Prior Publication Data

US 2002/0120131 A1 Aug. 29, 2002

Related U.S. Application Data

(60) Provisional application No. 60/257,378, filed on Dec. 21, 2000.

(51) Int. Cl.$^7$ .......................... C07Q 17/00; C07H 1/00; C08B 37/16; A61K 31/70
(52) U.S. Cl. ...................... 536/124; 536/103; 536/106; 536/127; 536/5; 536/110; 536/123.1; 536/112; 536/102; 536/46; 514/58; 514/60; 514/26; 514/777; 514/169; 514/964; 424/439; 424/488; 424/440; 424/493; 424/500; 426/27; 426/96
(58) Field of Search ................................ 536/124, 103, 536/106, 127, 5, 110, 123.1, 112, 102, 46; 514/58, 60, 26, 777, 169, 964; 424/439, 488, 440, 493, 500; 426/27, 96

(56) References Cited

U.S. PATENT DOCUMENTS

| | | | |
|---|---|---|---|
| 5,856,416 A | 1/1999 | Bachmann et al. | |
| 6,025,510 A | 2/2000 | Wimmer et al. | |
| 6,077,871 A | 6/2000 | Campeta | |
| 6,083,653 A | 7/2000 | Baur et al. | |
| 6,284,747 B1 | 9/2001 | Rubinfeld | |
| 6,316,020 B1 | 11/2001 | Whittle et al. | |
| 2001/0007862 A1 | 7/2001 | Kim | |
| 2001/0031756 A1 | 10/2001 | Kim et al. | |

FOREIGN PATENT DOCUMENTS

| | | |
|---|---|---|
| EP | 268215 | 5/1988 |
| EP | 441690 | 8/1991 |
| FR | 2581068 | 10/1986 |

OTHER PUBLICATIONS

Hedges, "Industrial applications of cyclodextrins", Chem. Rev. 98, 2035–2044, 1998.*

* cited by examiner

Primary Examiner—James O. Wilson
Assistant Examiner—Devesh Khare
(74) Attorney, Agent, or Firm—Muserlian, Lucas and Mercanti

(57) ABSTRACT

The process entails increasing the concentration of cyclodextrin to 15% (w/w) and above to form complexes through a precipitation process in order to increase the yield of complexes, increase the amount of guest complexed, and decrease the particle size of the complex.

8 Claims, No Drawings

PRODUCTION OF CYCLODEXTRIN COMPLEXES

PRIORITY CLAIM

This application claims the domestic priority under 35 USC 119(e) of U.S. Provisional Patent Application Ser. No. 60/257,378 filed Dec. 21, 2000.

BACKGROUND OF THE INVENTION

1. Field of the Invention

This invention relates to a process for making cyclodextrin complexes and, more particularly, to a method for forming a complex of cyclodextrin and a guest by precipitation.

2. Art Related to the Invention

Cyclodextrins, also called "Schardingers dextrins", cycloamyloses, cyclomaltoses and cycloglucans, are oligomers of anhydroglucose, bonded together by alpha 1,4 bonds to form a ringed compound. A six membered ring is called alpha cyclodexrin; seven, beta cyclodextrin; and eight, gamma cyclodextrin. These six, seven and eight membered rings are also referred to as cyclomaltohexaose, cyclomaltoheptaose and cyclomaltooctaose, respectively.

Conventionally, cyclodextrins are obtained by treating a starch slurry with enzyme or acid to produce a gelatinized and liquefied slurry having a DE between 1 and 5. The gelatinized and liquefied starch slurry is then treated with cyclodextrin glycosyltransferase (CGT), at the appropriate pH, temperature and time for the selected CGT. The enzyme, CGT, is obtained from microorganisms such as *Bacillus macerans, B. magaterium, B. circulans, B. stearothermohilus, and Bacillus* sp. (alkalophilic) as well as others. The resulting digest from treatment of a gelatinized and liquefied starch slurry with CGT is then subjected to a separation and purification process to obtain cyclodextrins.

One of the commercially important aspects of cyclodextrins is their ability to form complexes with other chemical compounds. Physically, a cyclodextrin is donut-shaped. The interior of the donut is hydrophobic. The consequence of this is that cyclcodextrins are able to form inclusion complexes with substances that are less polar than water and have outer geometric dimensions corresponding to the diameter of the cyclodextrin cavity. Often the exterior of the cyclodextrin is modified to increase its hydrophilic nature. The cyclodextrin or modified cyclodextrin can be complexed with an insoluble or hydrophobic compound thereby forming a hydrophilic complex. In simple terms, this allows a compound insoluble in water to become soluble in water. The term "cyclodextrin" as used in the specification and claims means not only cyclodextrin per se but also modified cyclodextrins and branched cyclodextrins as well as combinations and mixtures thereof.

The most widely used method for forming a complex between a cyclodextrin and a guest molecule involves dissolving the cyclodextrin in water with a guest molecule and collecting the precipitate that forms. Conventionally, an aqueous solution of 10% (w/w) or less cyclodextrin is formed and then the guest is mixed into this solution. Mixing is continued and the resulting precipitate collected.

One of the problems with such a process is the large volume of water used to form a solution of guest molecule and cyclodextrin. This large volume of water creates processing problems and requires a filtration step to recovering the complex. Additionally, the precipitate typically had a large particle size which made it unfit for certain applications. It is generally recognized by those of skill in the art of cyclodextrins that precipitation is not a commercially viable method for making complexes.

SUMMARY OF THE INVENTION

It has now been discovered that by using a high concentration of cyclodextrin during a precipitation process that the yield of complexes, production efficiency, and particle size can be controlled. Furthermore, it has been found that the precipitation process of the present invention is commercially viable.

Broadly, the present invention comprises increasing the yield of complexes by (a) forming a solution of cyclodextrin and guest molecule in a liquid solvent wherein the cyclodextrin is present at a concentration of about 15% (w/w) or above, and said solution has a molecular ratio of cyclodextrin to guest of about 1:1 to about 10:1;

(b) mixing the solution to allow a complex to form as a precipitate; and (c) separating said precipitate from said solution to recover said complex.

Optionally, the recovered complexes are dried. Likewise, the production efficiency is increased by increasing the concentration of cyclodextrin in solution. Also, by increasing the concentration of cyclodextrin in solution, the particle size of the recovered complex is decreased.

By using an increasing concentration of cyclodextrin in solution, the dynamic equilibrium is in favor of the association, complexation of the cyclodextrin and guest. This also means that there are more complexes which cause the faster formation of a precipitate because the solubility level of complex is more quickly exceeded. The precipitation of the complexes, in turn, promotes further complexation in order to maintain the equilibrium of the reaction. In turn, this creates a higher yield of complexes and lesser loss of complexes in the mother liquor.

Additionally, it is surprising and unexpected that the particle size of the complex is controlled as well as the yield and production efficiency. One of skill in the art would think that the complex would be large, yield would be low, and efficiency decreased because it is typical of uncomplexed cyclodextrin to adhere to the complex during precipitation. Thus, one would expect a large particle size, poor efficiency, and low yields to result from a solution with a high concentration of cyclodextrin. That, in fact, just the opposite happens, i.e. that the complex has a small particle size, efficiency is increased, and yield is increased, is surprising and unexpected.

Forming the solution of cyclodextrin is conducted in a conventional manner using conventional equipment, except for the high concentration of cyclodextrin in solution.

The temperature of solution at formation is preferably about 20° C. to about 100° C. and, more preferably, about 60° C. to about 80° C. Above room temperature helps promote solubility of the cyclodextrin.

Instead of or in addition to heating, the pH of the solution assists in formation of the cyclodextrin solution. At a high pH (e.g. 12), beta cyclodextrin solutions of 50% or greater can be obtained at room temperature. Preferably, the pH is adjusted to about 11 to about 13 to increase the concentration of the cyclodextrin in solution. The pH is adjusted back to neutral after addition of the guest. Adjusting the pH to a high level and adjusting the pH back to neutral is done in a conventional manner using conventional equipment.

The pressure is about atmospheric although slightly elevated pressures can be used in the process of the present invention.

The container in which the process takes place is formed is suitably a large vat equipped with an impeller for mixing. The mixing step is conducted in a batchwise process equipped with a suitable container with a mixing device.

The cyclodextrin is preferably first added to the solvent and mixed with the solvent to form a solution and then the guest is mixed into the solution. However, the cyclodextrin and guest can be added simultaneously to the solution.

The amount of cyclodextrin in solution is about 15% (w/w) and above and, more preferably, about 20% (w/w) and above. Good results have been obtained at cyclodextrin concentrations of about 20% (w/w) to about 40% (w/w).

Preferably, only one type of cyclodextrin is employed, for example, unmodified beta cyclodextrin. However, more than one cyclodextrin can be employed, for example, beta cyclodextrin and a modified beta cyclodextrin. In industrial applications, it can be more economical not to use a pure form of cyclodextrin since the steps necessary for obtaining a pure cyclodextrin are costly. It being understood by those of skill in the art that the digest of raw cyclodextrin which contains different cyclodextrins as well as oligomers and fractions of starch granules, can be employed in the present invention. In addition to the cyclodextrins, other materials can be added, such as starches, gums, maltodextrins and surfactants.

Preferably, a single chemical guest is employed in the present invention, however, more than one type of guest molecule can be used in the present invention. The molecular ratio of cyclodextrin to guest or guests in the solution is suitably about 1:1 to about 10:1 and, more preferably, about 2:1 to about 5:1.

The mixing step is conducted using conventional equipment in a conventional manner. Suitably, the impeller in the vat in which the solution is formed is a suitable means to mix the solution. The mixing should be conducted at high speed to form the complex. The temperature and pressure employed during the formation step is maintained during the mixing step.

The mixing step is conducted for a period of time to allow the complex to form and the precipitate to fall out of solution. Suitably, the time necessary to conduct mixing is about 1 hour to about 24 hours and, more preferably, about 5 hours to about 12 hours.

The solvent employed is preferably water, however, an organic solvent or a mixture of water and a solvent can be used. Suitable organic solvents include methyl alcohol, ethyl alcohol, and dimethyl sulfoxide. As will be understood, the formation step does not form a "true," solution since the guest is oftentimes insoluble in the solvent. Rather, the solution is more of a blend or mixture of the compounds.

In order to promote precipitation, the solution can be cooled to about atmospheric temperature. Cooling promotes precipitation. If the process is conducted in a semi-continuous manner using multiple containers, the mixed solution is transferred to a second container where mixing is continued and the solution is allowed to cool.

Separating the precipitate from the solution is done in a conventional manner using conventional means of solid-liquid separation. Suitable means include vacuum filtration, centrifugation, and decanting. A combination of these methods can also be employed to separate the precipitate from the solution.

Drying the precipitated complex is done in a conventional manner using conventional means. Suitable drying techniques include hot air oven, freeze drying, or desiccator over phosphor pentoxide.

These and other aspects of the present invention may be more fully understood by reference to one or more of the following examples:

EXAMPLE 1

This example illustrates that a higher yield of precipitate is obtained by increasing the solids level of cyclodextrin in solution. The results of this example are reported in Table 1 below.

TABLE 1

| BCD conc. % (w/w) | Precipitate Obtained | % Yield |
| --- | --- | --- |
| 10 | 70.3 | 56.2 |
| 15 | 76.0 | 60.7 |
| 20 | 85.9 | 68.6 |
| 30 | 92.0 | 73.7 |
| 40 | 94.8 | 75.6 |

Each solution was made with beta cyclodextrin and water. The mixture was heated to about 140° F. (60° C.) to about 212° F. (100° C.) depending on the solids level and stirred with a magnetic stir rod. In case, 100 g of beta cyclodextrin was used while the amount of was varied to provide for the different concentrations. For sample, the 10% solution contained 100 g of beta cyclodextrin and 900 g of water while the 15% solution contained 100 g of beta cyclodextrin and 566.6 g of water.

To each solution, 25 grams of an artificial raspberry flavor (#005416, The Edlong Corp., 225 Scott Street, Elk Grove, Ill. 60007-1299) was added to act as a guest. The heat was turned off and the mixture was allowed to cool to room temperature under continuous stirring overnight (~18 hrs.). Each precipitated product was collected by vacuum filtration over about a 3 hour period and dried in a 100° C. oven for 2 hours to produce a fluffy, dry powder. The weight of each product was obtained and its percentage production yield calculated using the equation, Yield %=wt of precipitate/(wt of BCD+wt of flavor) or $$\text{Yield \%} = \frac{\text{wt of precipitate}}{\text{wt of BCD} + \text{wt of flavor}}$$

As can be seen, increasing the concentration of cyclodextrin in solution increased not only the amount of precipitate obtained, but also the yield. This is surprising and unexpected because the amount of guest and cyclodextrin in each solution is the same, 100 g BCD, 25 g raspberry flavor. The only difference between the solution is the decrease in water. Thus, the decrease in water promotes greater precipitate formation. It is presumed that the precipitate is 100% complex, however, it is known that some of the precipitate is also uncomplexed cyclodextrin and uncomplexed flavor.

EXAMPLE 2

This example illustrates that the precipitate collected at increased concentrations of cyclodextrin in solution also increased the percentage of guest in the collected precipitate. Table 2 below illustrates the results.

TABLE 2

| BCD conc. % (w/w) | Load % | Precipate Obtained (g) | Flavor Recovered (g) |
|---|---|---|---|
| 10 | 4.2 | 70.3 | 3.0 |
| 15 | 6.2 | 76.0 | 4.7 |
| 20 | 7.5 | 85.9 | 6.4 |
| 30 | 9.0 | 92.0 | 8.3 |
| 40 | 10.2 | 94.8 | 9.7 |

From each complex prepared in Example 1, a sample (in duplicate) of 50±1 mg was accurately weighed and placed in a 15 ml test tube. Water (5 ml) and chloroform (5 ml) were in turn added to the tube, which was then sealed tightly with a screw cap. The sample tube was shaken vigorously by hand before placed in a water bath of 68+2° C. The sample was incubated at 68° C. For about 2 hours during which it was subjected to hand shaking at about each 30 minute interval. Upon completion of incubation, the sample was placed at room temperature for at least 2 hours until the aqueous and the organic phases were clearly separated. A portion of the (bottom) chloroform layer was withdrawn and subjected to GC (gas chromatography) analysis using known amounts of raspberry flavor as standards for quantitation, which had gone through the same extraction process. Table 2 presents the average percentage load, defined as grams of flavor per 100 grams of complex. Total flavor recovered was calculated using the equation:

Flavor recovered (g)=(load %)×(wt of complex (g)).

Thus, by increasing the concentration of cyclodextrin in solution, the amount of guest in the precipitate is also increased. Thus, ore complexation takes place at higher cyclodextrin concentrations.

EXAMPLE 3

This example illustrates that the particle size of the complex decreases with increased cyclodextrin concentration in the solution. The results are reported in Table 3 below.

TABLE 3

| BCD conc. % (w/w) | $X_{50}$ (μm) | $X_{10}$ (μm) |
|---|---|---|
| 10 | 32 | 10 |
| 15 | 28 | 8 |
| 20 | 25 | 7 |
| 30 | 20 | 6 |
| 40 | 18 | 5 |

A sample (in triplicate) of each complex prepared in Example 1 was analyzed on Sympatec™ Laser Particle Sizer. The data reported are volume based. $X_{50}$=50% of the particles are smaller than . . . μm while $X_{10}$=10% of the particles are smaller than . . . μm.

EXAMPLE 4

This example illustrates that, for a single molecular guest, a higher concentration of cyclodextrin in solution also results in a higher concentration of guest in the resulting precipitate.

To 50 g of BCD on anhydrous basis, water was added separately in the amounts to make up the solutions containing 8.2% (w/w) BCD and 25% (w/w) BCD, i.e. 562.5 g and 150 g, respectively. Each suspension was pre-heated to 55° C. before addition of 8.0 grams of menthol The mixture was agitated at 200 rpm and 55° C. For 4 hours. The heating was turned off and the contents were allowed to cool to room temperature overnight (~20 hrs). The mixture was transferred to a refrigerator (~4° C.) and let stand for another 18 hrs;, followed by harvesting the precipitate through vacuum filtration. The product was obtained as a powder after drying in a 100° C. oven for 2 hours.

The product from the 8.2% solution had an obvious menthol odor whereas the product from the 25% solution had none. Further analyses revealed that menthol in the 25% product was complexed with the cyclodextrin while some of the guest in the 8.2% product remained in the uncomplexed state, hence, the odor of menthol.

EXAMPLE 5

This example illustrates that gamma cyclodextrin (GCD) complexes at high concentrations.

A 35% solution was prepared by heating 120 grams of GCD in water to about 35° C. DEET (N,N-Diethyl-3-metholbenzamide, 35.4 grams), an insect repellent, was added to the GCD solution under stirring. The heat was turned off and the complexation process proceeded as described in Example 1. After drying in a 75° C. oven, the product (157 grams, ~100%) was obtained as a powder containing 19.4% of DEET.

EXAMPLE 6

This example illustrates that alpha cyclodextrin (ACD) complexes at high cyclodextrin concentrations.

A 20% solution was prepared by heating 50 grams of ACD in water to about 40° C. N-docosanol (8.4 grams), an active pharmaceutical compound, was added to the ACD solution under stirring. The heat was turned off and the complexation process proceeded as described in Example 1. Upon freeze drying, the product (58.2 grams, ~99.7%) was obtained as a powder containing 14.3% of the guest.

It will be understood that the claims are intended to cover all changes and modifications of the preferred embodiments of the invention herein chosen for the purpose of illustration which do not constitute a departure from the spirit and scope of the invention.

What is claimed is:

1. A process for increasing the yield of a complex of cyclodextrin and a guest molecule comprising the steps of:
   (a) forming a solution of cyclodextrin and said guest molecule in a solvent by heating the solution to about 60° C. to about 100° C. wherein the cyclodextrin is present at a concentration of about 15% (w/w) or above, said solution has a molecular ratio of cyclodextrin to guest molecule of about 1:1 to about 10:1;
   (b) mixing the solution to allow a complex to form as a precipitate while maintaining the temperature;
   (c) cooling the solution to atmospheric temperature to promote precipitation; and
   (d) separating said precipitate from said solution to recover said complex.

2. The process of claim 1 further comprising the step of drying the precipitate.

3. The process of claim 1 wherein the cyclodextrin is a α-cyclodextrin, a β-cyclodextrin, or a γ-cyclodextrin.

4. The process of claim 1 wherein the solvent is water or an organic solvent.

5. A process for increasing the amount of a guest molecule complexed with cyclodextrin comprising the steps of:

(a) forming a solution of cyclodextrin and said guest molecule in a solvent by adjusting the pH to about 11 to about 13 wherein the cyclodextrin is present at a concentration of about 15% (w/w) or above, said solution has a molecular ratio of cyclodextrin to guest molecule of about 1:1 to about 10:1;

(b) adjusting the pH to neutral;

(c) mixing the solution to allow a complex to form as a precipitate; and (d) separating said precipitate from said solution to recover said complex.

6. The process of claim 5 further comprising the step of drying the precipitate.

7. The process of claim 5 wherein the cyclodextrin is a α-cyclodextrin, a β-cyclodextrin, or a γ-cyclodextrin.

8. The process of claim 5 wherein the solvent is water or an organic solvent.

* * * * *